(12) United States Patent
Baek

(10) Patent No.: US 6,636,286 B1
(45) Date of Patent: Oct. 21, 2003

(54) TRANSFLECTIVE LIQUID CRYSTAL DISPLAY DEVICE HAVING REFLECTIVE AND TRANSPARENT PIXEL ELECTRODES

(75) Inventor: Heume-Il Baek, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 195 days.

(21) Appl. No.: 09/717,267

(22) Filed: Nov. 22, 2000

(30) Foreign Application Priority Data

Nov. 26, 1999 (KR) .......................................... 1999-52862

(51) Int. Cl.[7] .............................................. G02F 1/1343
(52) U.S. Cl. ........................................ 349/114; 349/143
(58) Field of Search ................................. 349/108, 109, 349/114, 106, 113, 143

(56) References Cited

U.S. PATENT DOCUMENTS

| | | | |
|---|---|---|---|
| 6,084,650 A | * | 7/2000 | Sekiguchi et al. ........... 349/106 |
| 6,124,909 A | * | 9/2000 | Miyashita et al. .......... 349/109 |
| 6,215,538 B1 | * | 4/2001 | Narutaki et al. ............ 349/106 |
| 6,281,952 B1 | * | 8/2001 | Okamoto et al. ............. 349/12 |

\* cited by examiner

*Primary Examiner*—Robert H. Kim
*Assistant Examiner*—Andrew Schechter
(74) *Attorney, Agent, or Firm*—Birch, Stewart, Kolasch & Birch, LLP

(57) ABSTRACT

The invention provides a transflective liquid crystal display device including: first and second substrates opposing each other; liquid crystal material interposed between the first and second substrates; first and second electrodes, arranged in correspondence to the first and second substrates, respectively, to apply an electric field to the liquid crystal material; reflective pixel electrodes being positioned between the liquid crystal material and the second substrate; transparent pixel electrodes being positioned between the liquid crystal material and the second substrate; a color filter layer positioned between the first substrate and the liquid crystal material, the color filter layer having first portions aligned with the reflective pixel electrodes and second portions aligned with the transparent pixel electrodes; and a backlight device under the second substrate.

11 Claims, 6 Drawing Sheets

TRANSFLECTIVE LIQUID CRYSTAL DISPLAY DEVICE HAVING REFLECTIVE AND TRANSPARENT PIXEL ELECTRODES

CROSS REFERENCE

This application claims the benefit of Korean Patent Application Nos. 1999-552862 filed on Nov. 26, 1999 under 35 U.S.C. §119, the entirety of each of which is hereby incorporated by reference.

BACKGROUND

1. Field of the Invention

The present invention relates to a liquid crystal display (LCD) device, and more particularly, to a transflective LCD device.

2. Description of Related Art

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed therebetween. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as shown in FIG. 1, which shows a transmittance (in brightness %) after light passes through each layer of the device. For this reason, the transmissive LCD device requires a high, initial brightness, and thus electric power consumption by the backlight device increases. A relatively heavy battery is needed to supply a sufficient power to the backlight of such a device. However, this has a problem that the battery can not be used for a long time.

In order to overcome the problem described above, the reflective LCD has been developed. Since the reflective LCD device uses ambient light, it is light and easy to carry. Also, the reflective LCD device is superior in aperture ratio to the transmissive LCD device.

FIG. 2 shows a sub-pixel of a typical reflective LCD device 100 in plane. A plurality of gate lines, including (N−1)th gate line 6 and Nth gate line 8, are spaced apart from each other, and a plurality of data lines, including Nth data line 2 and (N+1)th gate line 4, are arranged perpendicular to the gate lines. In an area defined by the gate and date lines, a reflective electrode 10 is positioned. The gate and data lines and the reflective electrodes make a shape of an array matrix.

In the Nth gate line 8, near a cross point of the Nth gate and data lines 8 and 2, a gate electrode 18 is positioned, and a source electrode 12 is positioned in the Nth data line 2. The source electrode 12 overlaps a portion of the gate electrode 18. Spaced apart from the source electrode 12, a drain electrode 14 is positioned and overlaps a portion of the gate electrode 18. The drain electrode 14 electrically contacts a reflective electrode 10 via a drain contact hole 16 that is formed on the drain electrode 14. Conventionally, the reflective electrode 10 is a metal that has a superior reflexibility.

With reference to FIG. 3, a cross-sectional structure of the conventional reflective TFT-LCD device shown in FIG. 2 is described in detail.

On a substrate 1, the gate electrode 18 and the gate insulating layer 20 are positioned sequentially. The gate insulating layer 20 covers the gate electrode 18. On the gate insulating layer 20, a semiconductor layer 22 is positioned, and the source and drain electrodes 12 and 14 that contact the semiconductor layer 22 are positioned.

A passivation layer 24 is positioned over the overall surface of the substrate 1. On the passivation layer 24, the drain contact hole 16 is positioned to expose a portion of the drain electrode 14. The reflective electrode 10 is positioned on the passivation layer 24 and contacts the drain electrode 14 via the drain contact hole 16.

However, the reflective LCD device is affected by its surroundings. For example, the brightness of ambient light in an office differs largely from that outdoors. Even in the same location, the brightness of ambient light depends on the time of day (e.g., noon or dusk).

In order to overcome the problems described above, a transflective LCD device has been developed.

FIG. 4 shows a conventional transflective LCD device. As shown in FIG. 4, the transflective LCD device includes gate line 50 arranged in a transverse direction, data line 60 arranged in a longitudinal direction perpendicular to the gate line 50, a thin film transistor "T" (TFT) located near the cross points of the gate and data line 50 and 60. Each of the TFTs "T" includes gate, source, and drain electrodes 52, 62, and 64. The gate and source electrodes 52 and 62 are extended from the gate and data line 50 and 60, respectively. The transflective LCD device further includes a reflective electrode 68 and a pixel electrode 70. The pixel electrode 70 is electrically connected with the drain electrode 64 via a first contact hole 66, and the reflective electrode 68 is electrically connected with the pixel electrode 70 via a second contact hole 67. The reflective electrode 68 is made of an opaque conductive material and preferably the same material as the gate electrode 52, and the pixel electrode 70 is made of a transparent conductive material such as indium tin oxide (ITO). The reflective electrode 68 has a light transmitting hole 72 for transmitting light from a backlight device (see 102 in FIG. 5). The light transmitting hole 72 may have a circular or a rectangular shape and thus is not limited in its shape. The pixel electrode 70 should have a sufficient area to cover the light transmitting hole 72.

As shown in FIG. 5, the conventional transflective LCD device includes upper and lower substrates 106 and 108 with a liquid crystal layer 100 interposed therebetween. The upper substrate 106 includes a color filter 104, and the lower substrate 108 includes a switching element (not shown), a pixel electrode 70 and a reflective electrode 68. A protection film 74 is interposed between the pixel and the reflective electrodes 70 and 68. The reflective electrode 68 is made of an opaque conductive material having a good reflectance, and a light transmitting hole 72 is formed therein. The transflective LCD device further includes a backlight device 102. The light transmitting hole 72 serves to transmit light 114 from the backlight device 102.

The transflective LCD device in FIG. 5 is operable in transmissive and reflective modes. First, in reflective mode, the incident light 110 from the upper substrate 106 is reflected on the reflective electrode 68 and directed toward the upper substrate 106. At this time, when electrical signals are applied to the reflective electrode 68 by the switching element (not shown), the phase of the liquid crystal layer 100 varies and thus the reflected light 120 is colored by the color filter 104 and displayed in the form of images.

Further, in transmissive mode, light 114 generated from the backlight device 102 passes through portions of the pixel electrode 70 corresponding to the transmitting hole 72. When the electrical signals are applied to the pixel electrode 70 by the switching element (not shown), phase of the liquid crystal layer 114 varies. Thus, the light 114 passing through the liquid crystal layer 100 is colored by the color filter 104 such that images are displayed.

As described above, since the transflective LCD device has both transmissive and reflective modes, the transflective LCD device can be used without regard to the time of day (e.g., noon or dusk). It also has the advantage that it can be used for a long time by consuming low power. However, since the reflective electrode has a the transmitting hole 72, the conventional transflective LCD device has a very low light utilizing efficiency compared to either the reflective LCD device or the transmissive LCD device alone.

In the reflective mode of the transflective LCD device, incident light enters the color filter 104 and is reflected on the reflective electrode 68 and reenters the color filter 104. That is, the light passes through the color filter twice. But, in the transmissive mode, light from the backlight 102 passes through the color filter only one time. Thus, the color purity that users perceive varies according to the mode of the LCD device.

As shown in FIG. 6, the conventional transflective LCD device includes a plurality of pixels, and a pixel 200 includes three different sub-pixels of R(red), G(green), and B(blue). Each sub-pixel R, G or B has the same configuration shown in FIGS. 4 and 5.

In an actual transflective LCD device according to the concept of the conventional transflective LCD device described above, since one sub-pixel has both of the transmissive and reflective portions, various masks should be adapted with respect to structures and ratios of the reflective and transmissive portions. Further, a protection film should be interposed between the reflective and the pixel electrodes, which should contact electrically with each other. Accordingly, the fabricating process and cost becomes complicated and high.

SUMMARY OF THE INVENTION

Accordingly, the present invention is directed to a transflective liquid crystal display device that substantially obviates one or more of the problems due to limitations and disadvantages of the related art.

An object of the invention is to provide a transflective LCD device that can be fabricated via simpler processes.

Another object of the invention is to provide a transflective LCD device that can achieve substantially accurate reflection versus transmission ratios.

In accordance with the purpose of the invention, as embodied and broadly described, the invention includes a transflective liquid crystal display device, including: first and second substrates opposing each other; liquid crystal material interposed between the first and second substrates; first and second electrodes, arranged in correspondence to the first and second substrates, respectively, to apply an electric field to the liquid crystal material; reflective pixel electrodes being positioned between the liquid crystal material and the second substrate; transparent pixel electrodes being positioned between the liquid crystal material and the second substrate; a color filter layer positioned between the first substrate and the liquid crystal material, the color filter layer having first portions aligned with the reflective pixel electrodes and second portions aligned with the transparent pixel electrodes; and a backlight device under the second substrate.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 7:
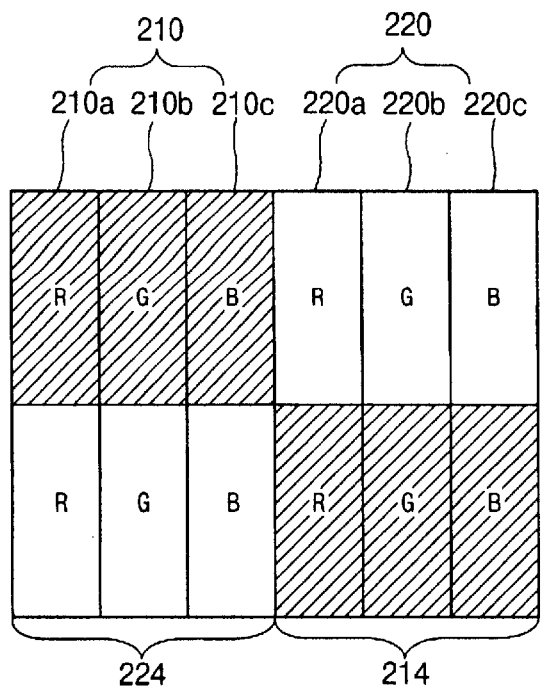
FIG. 7 conceptually illustrates an arrangement of pixels according to a preferred embodiment of the present invention.

FIG. 7 shows an arrangement of pixels according to the preferred embodiment of the present invention. A first reflective pixel 210 including reflective sub-pixels 210a, 210b, and 210c and a first transparent pixel 220 including transparent sub-pixels 220a, 220b, and 220c are positioned side by side. The sub-pixels 210a and 220a, 210b and 220b, and 210c and 220c, respectively, display red, green, and blue colors. The reflective and transparent pixels 210 and 220 have the same configuration except for their pixel electrode materials. The reflective pixel 210 adopts an opaque conductive material, such as a metal, for the pixel electrode (not shown), while the transparent pixel 220 adopts a transparent conductive material, such as an indium tin oxide (ITO), for the pixel electrode.

Second reflective and transparent pixels 214 and 224 have the same configurations as the first reflective and transparent pixels 210 and 220, respectively. That is to say, one reflective pixel is surrounded by four transparent pixels, and vice versa.

Figure 4:
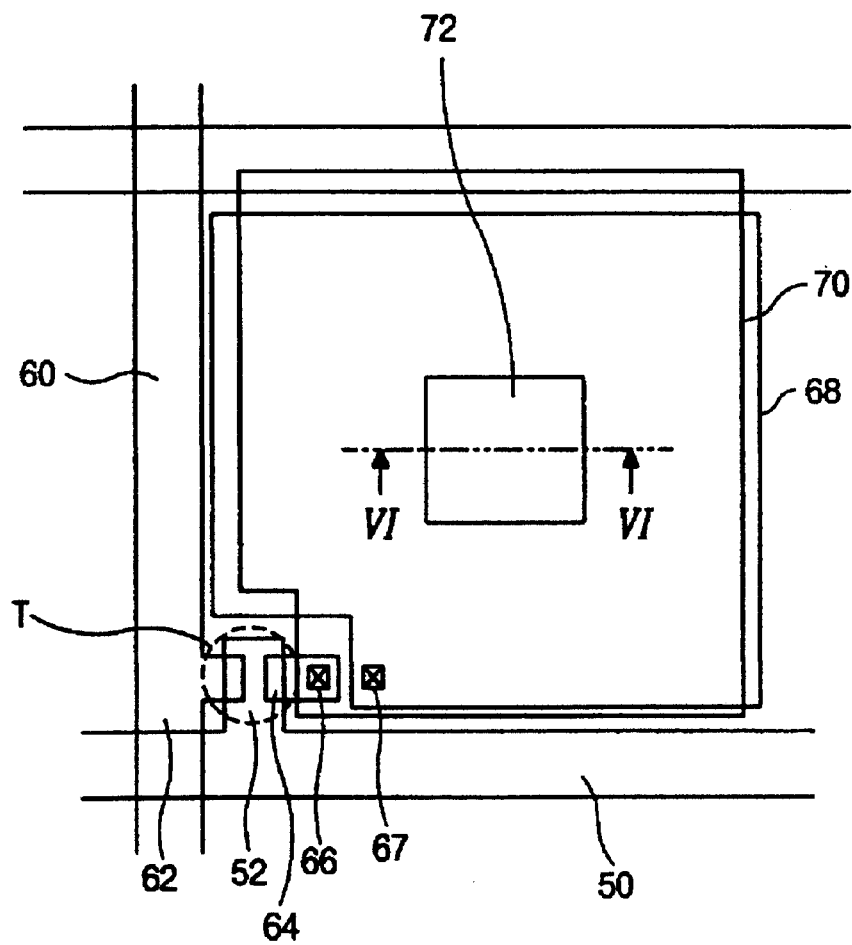
FIG. 4 is a plan view illustrating a sub-pixel of a conventional transflective LCD device.
Figure 5:
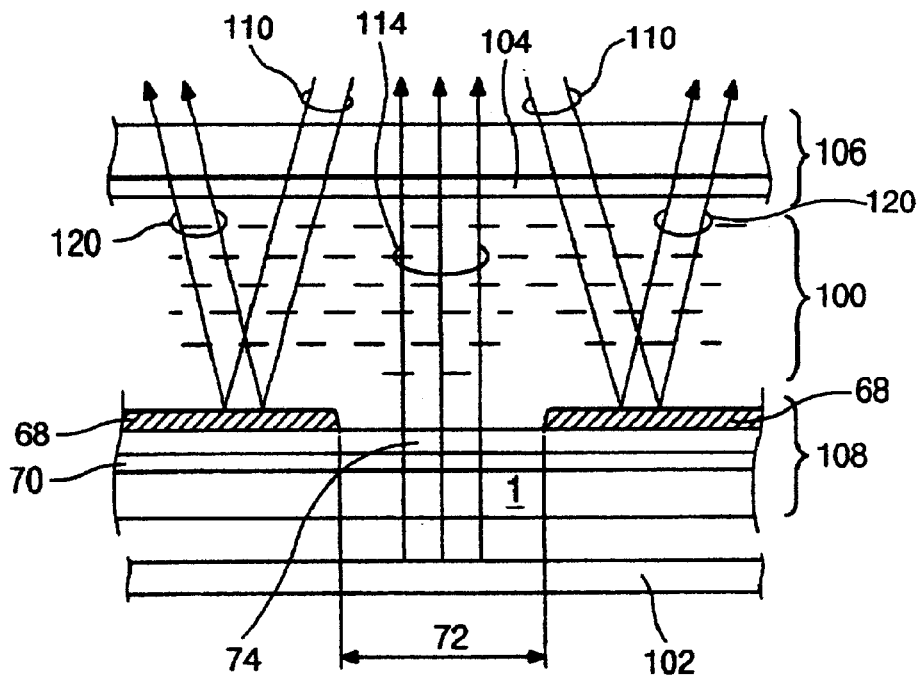
FIG. 5 is a cross-sectional view taken along a line "—"
Figure 6:
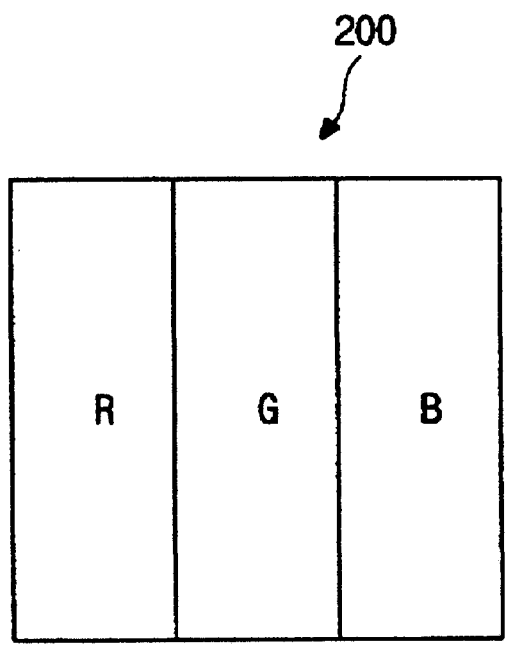
FIG. 6 conceptually illustrates a pixel of a conventional transflective LCD device.

On the contrary to the conventional transflective pixel shown in FIG. 4, since the reflective and transparent pixels have the same configuration, masks used for fabricating the pixels become simple. Further, since one sub-pixel includes just a reflective or a transparent pixel electrode, there is no need for a protection film to be interposed between the reflective and transparent pixel electrodes, and no needs for connecting the reflective and transparent pixel electrodes electrically. Accordingly, the fabricating processes become much simpler.

Figure 8A:
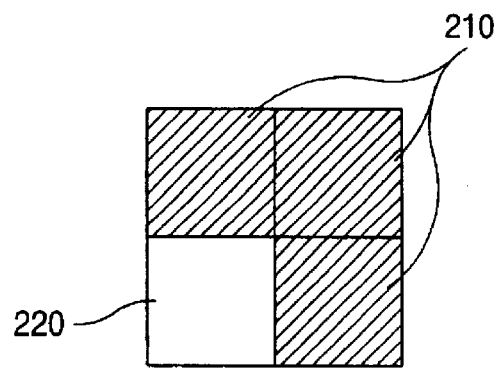
FIGS. 8A to 8C illustrate various arrangements of pixels, with respect to reflection versus transmission ratios, according to the preferred embodiment of the present invention.
Figure 8B:
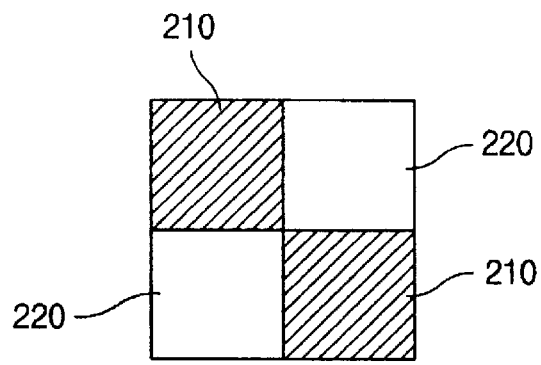
Figure 8C:
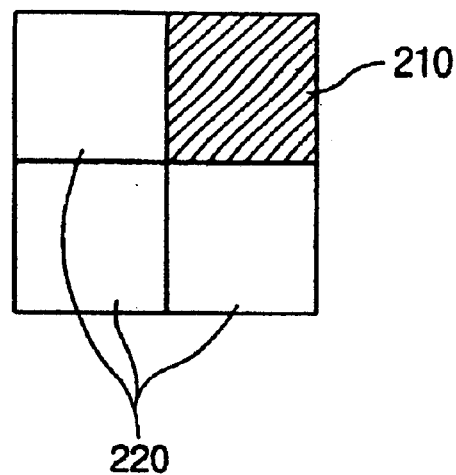

Different ratios of the reflective versus transparent pixels can be easily accomplished as shown in FIGS. 8A to 8C. In FIG. 8A, among four pixels, three are reflective pixels 210 while one is transparent pixel 220, such that the ratio of the reflective versus transparent pixels is 3:1. FIGS. 8B and 8C illustrate the ratios of 1:1 and 1:3, respectively.

In the inventive transflective LCD device according to the preferred embodiment of the present invention, the reflection versus transmission ratio can be changed easily and accurately by way of changing the relative number of the reflective and transparent pixels, without adopting new masks.

Figure 9:
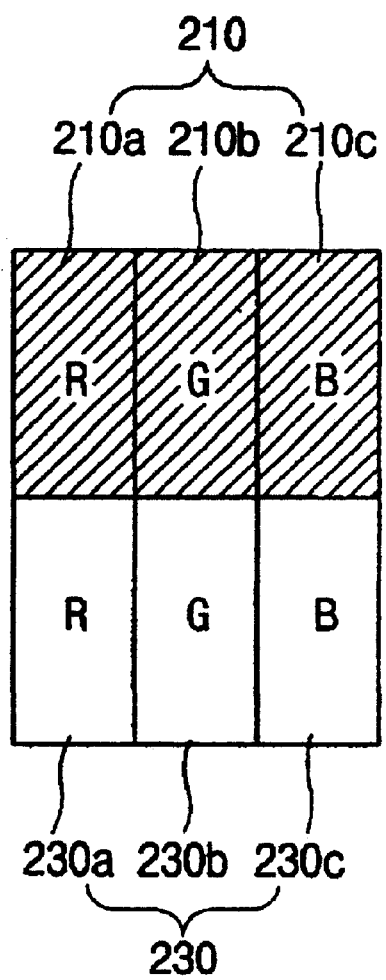
FIG. 9 shows a strip-like arranged sub-pixels in the pixel according to the preferred embodiment of the present invention.
Figure 10:
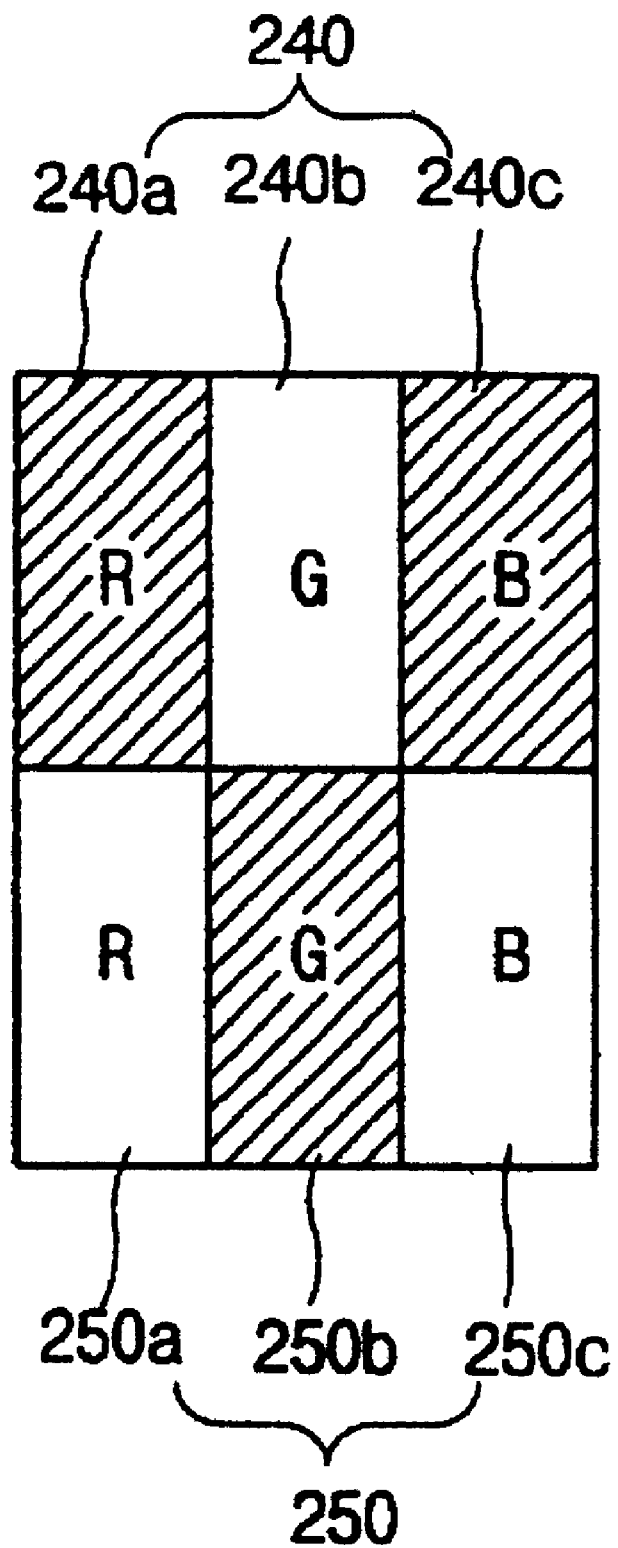
FIG. 10 shows a mosaic-like arranged sub-pixels in the pixel according to the preferred embodiment of the present invention.

In a pixel, the sub-pixels can be arranged in various forms such as a stripe-like or a mosaic-like one. In FIG. 9, the reflective sub-pixels 210a, 210b, and 210c of the reflective pixel 210 are arranged successively, transparent sub-pixels 230a, 230b, and 230c of the transparent pixel 230 are also arranged in the same strip-like form, and the transparent pixel 230 is located adjacent to the reflective pixel 210. However, in FIG. 10, a first transflective pixel 240 includes two reflective sub-pixels 240a and 240c that display red arid blue, and one transparent sub-pixel 240b therebetween. On the contrary, a second transflective pixel 250 includes two transparent sub-pixels 250a and 250c that display red and blue, and one reflective sub-pixel 250b therebetween.

Figure 1:
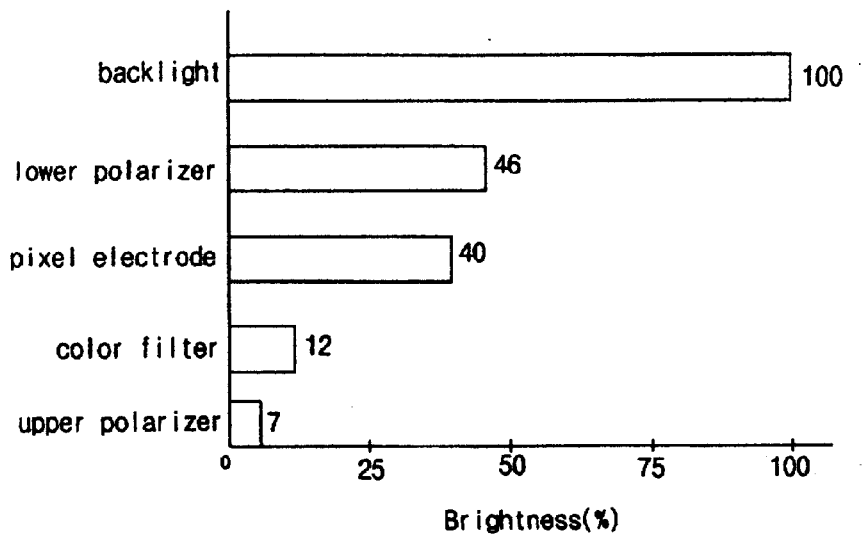
FIG. 1 is a graph illustrating transmittance after light passes through each layers of a typical transmissive LCD device.
Figure 2:
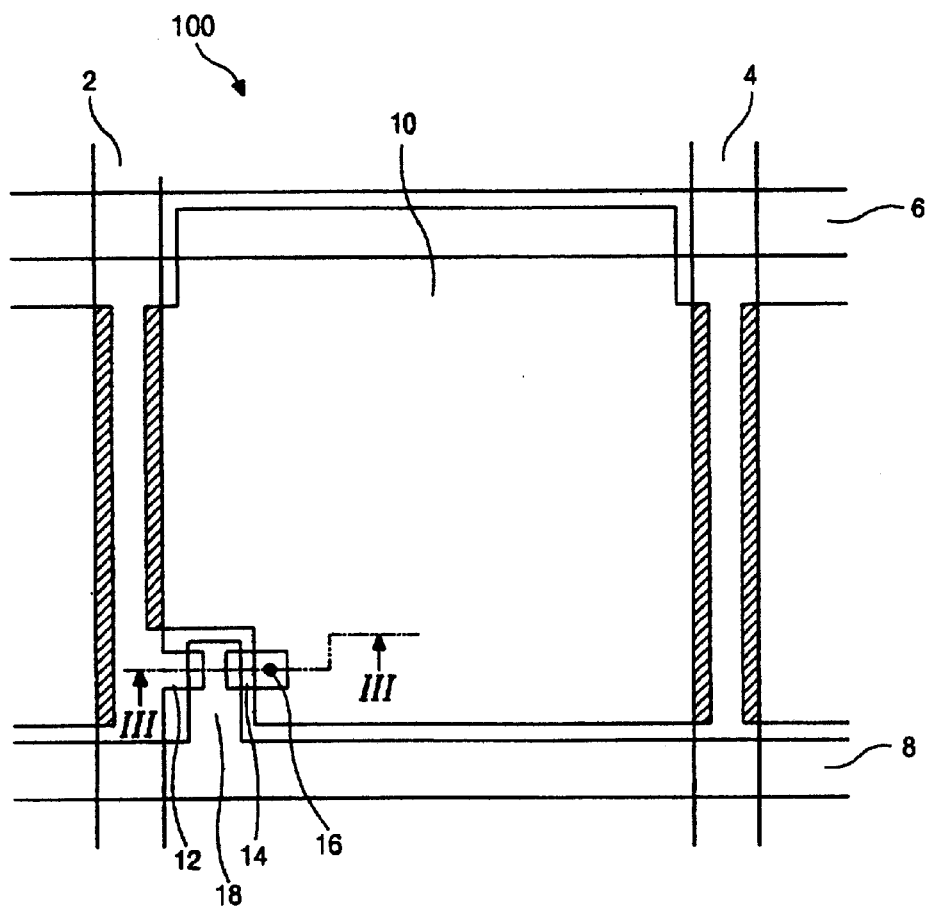
FIG. 2 is a plane view illustrating a typical reflective LCD device.
Figure 3:
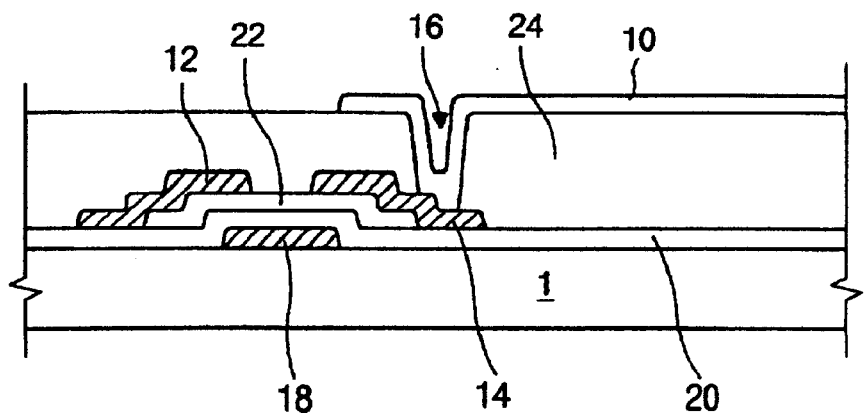
FIG. 3 is a cross-sectional view taken along a line "—"

In operation of the above-described transflective LCD device according to the preferred embodiment of the present invention, when the transparent sub-pixels display images, the reflective sub-pixels should not be perceived by users, and vice versa. Thus, the inventive sub-pixels of FIGS. 9 and 10 should be smaller and preferably half of the conventional sub-pixels of FIG. 2 or 4.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transflective liquid crystal display device comprising:
   first and second substrates opposing each other;
   liquid crystal material interposed between the first and second substrates;
   first and second electrodes, arranged in correspondence to the first and second substrates, respectively, to apply an electric field to the liquid crystal material;
   a plurality of reflective pixel electrodes being positioned between the liquid crystal material and the second substrate, the reflective pixel electrodes comprising a plurality of reflective subpixels, each of which emits a light of a different color;
   a plurality of transparent pixel electrodes being positioned between the liquid crystal material and the second substrate, the transparent pixel electrodes comprising a plurality of transparent subpixels, each of which emits a light of a different color, wherein each of the reflective and transparent subpixels includes only one of the group consisting of a reflective pixel electrode and a transparent pixel electrode;
   a color filter layer positioned between the first substrate and the liquid crystal material, the color filter layer having first portions aligned with the reflective pixel electrodes and second portions aligned with the transparent pixel electrodes; and
   a backlight device under the second substrate.

2. The device of claim 1, wherein the reflective pixel electrodes are an opaque metal.

3. The device of claim 1, wherein the transparent pixel electrodes are indium tin oxide (ITO).

4. The device of claim 1, wherein the reflective and transparent pixel electrodes make a strip-like arrangement.

5. The device of claim 1, wherein the reflective and transparent pixel electrodes make a mosaic-like arrangement.

6. A transflective liquid crystal display device comprising:
   first and second substrates opposing each other;
   liquid crystal material interposed between the first and second substrates;
   first and second electrodes, arranged in correspondence to the first and second substrates, respectively, to apply an electric field to the liquid crystal material;
   a plurality of reflective pixel electrodes being positioned between the liquid crystal material and the second substrate;
   a plurality of transparent pixel electrodes being positioned between the liquid crystal material and the second substrate;
   a color filter layer positioned between the first substrate and the liquid crystal material, the color filter layer having first portions aligned with the reflective pixel electrodes and second portions aligned with the transparent pixel electrodes; and
   a backlight device under the second substrate,
   wherein the reflective and transparent pixel electrodes form a mosaic-like pattern.

7. A transflective liquid crystal display device comprising:
   first and second substrates opposing each other;
   liquid crystal material interposed between the first and second substrates;
   a common electrode disposed between the first substrate and the liquid crystal material;
   gate lines and data lines disposed between the liquid crystal material and the second substrate, the gate lines and the data lines crossing each other to define pixel regions;
   reflective pixel electrodes positioned between the liquid crystal material and the second substrate, each reflective pixel electrode corresponding to a first pixel region;
   transparent pixel electrodes positioned between the liquid crystal material and the second substrate, each transparent pixel electrode corresponding to a second pixel region, wherein each of the first and second pixel regions includes only one of the group consisting of a reflective pixel electrode and a transparent pixel electrode;

a color filter layer positioned between the first substrate and the liquid crystal material, the color filter layer having first portions aligned with the reflective pixel electrodes and second portions aligned with the transparent pixel electrodes; and a backlight device under the second substrate.

8. The device of claim 7, wherein the reflective pixel electrodes are an opaque metal.

9. The device of claim 7, wherein the transparent pixel electrodes are indium tin oxide (ITO).

10. The device of claim 7, wherein the reflective and transparent pixel electrodes make a strip-like arrangement.

11. The device of claim 7, wherein the reflective and transparent pixel electrodes make a mosaic-like arrangement.

* * * * *